United States Patent [19]

Björklund et al.

[11] Patent Number: 5,621,626
[45] Date of Patent: Apr. 15, 1997

[54] METHOD AND DEVICE FOR CONTROL OF AN INSTALLATION FOR TRANSMISSION OF HIGH-VOLTAGE DIRECT CURRENT

[75] Inventors: Per-Erik Björklund, Bjursås; Tomas Jonsson, Grängesberg; Lars-Erik Juhlin, Ludvika, all of Sweden

[73] Assignee: Asea Brown Boveri AB, Västeras, Sweden

[21] Appl. No.: 538,219

[22] Filed: Oct. 3, 1995

[30] Foreign Application Priority Data

Oct. 13, 1994 [SE] Sweden ................................ 9403486

[51] Int. Cl.$^6$ ........................................ H02J 3/36
[52] U.S. Cl. ................................. 363/35; 363/51
[58] Field of Search ......................... 363/35, 37, 51, 363/79

[56] References Cited

U.S. PATENT DOCUMENTS

| | | | |
|---|---|---|---|
| 4,459,492 | 7/1984 | Rogowsky | 363/35 X |
| 4,578,743 | 3/1986 | Inokuchi et al. | 363/35 |
| 4,672,519 | 6/1987 | Liss | 363/35 |

Primary Examiner—Robert Nappi
Assistant Examiner—Y. J. Han
Attorney, Agent, or Firm—Watson Cole Stevens Davis, PLLC

[57] ABSTRACT

An installation for transmission of high-voltage direct current comprises a first and a second converter (SR1, SR2, respectively), each one controlled by a separate piece of control equipment (CE1, CE2, respectively). Each one of the pieces of control equipment comprises a current controller (CC). The current controller of the second converter is supplied with a second current reference value (IOL2) and a current margin (IOM). The control equipment of the second converter comprises a function-forming member (11), which in dependence on an applied measured value (UD) of the direct voltage forms the current margin such that, when the direct voltage exceeds a first preselected voltage level (Udf), it assumes a first value (IOMf) and, when the direct voltage is lower than the first voltage level, it assumes a second value (IOMs), the magnitude of the second value being greater than the magnitude of the first value.

10 Claims, 4 Drawing Sheets

METHOD AND DEVICE FOR CONTROL OF AN INSTALLATION FOR TRANSMISSION OF HIGH-VOLTAGE DIRECT CURRENT

TECHNICAL FIELD

The present invention relates to a method for control of an installation for transmission of high-voltage direct current and to a device for carrying out the method.

BACKGROUND ART

An installation for transmission of high-voltage direct current between two alternating-voltage networks comprises two converter stations, each one connected on its ac side to a separate one of the alternating-voltage networks, and a common dc connection. The dc connection may be in the form of an overhead line and/or a cable and also in certain parts consist of ground or water instead of a metallic conductor. Each one of the converter stations comprises a converter, usually at least one converter transformer for connection of the converter to the alternating-voltage network, as well as shunt filters for generation of reactive power and filtering of harmonics. The converters are normally line-commutated, current-source converters, by which is to be understood that the current commutation between the valves of the converters takes place by means of voltages occurring in the alternating-voltage network, and that the dc connection, viewed from the converters, occurs as a stiff current source.

During normal operation, one of the converters, hereinafter referred to as the rectifier, operates in rectifier operation, and the other, hereinafter referred to as the inverter, operates in inverter operation. Control equipment for the respective converter generates a control signal corresponding to a control angle $\alpha$ at which firing pulses are applied to the valves of the converters. For the purpose of minimizing the consumption of reactive power by the converters, and reducing the stresses on components included in the converter stations, it is advantageous to control the rectifier with the smallest possible control angle $\alpha$ and to control the inverter with a control angle which results in the smallest possible extinction angle $\gamma$ (margin of commutation) without jeopardizing the controlled operation.

The control system of the installation is, therefore, usually designed such that the inverter is controlled to a suitable maximum direct voltage for the operating conditions of the installation, taking into consideration safety margins with respect to commutating errors, voltage variations on the ac network, and other deviations from nominal operation which may occur whereas the rectifier is controlled in current control. The current reference value of the current control is formed in dependence on a current order, which is turn is formed in dependence on a power order and the prevailing direct voltage in such a way that the direct current and hence the transferred active power remain at a desired value. The control angle of the rectifier during stationary operation is chosen as small as possible while taking into consideration that the current control requires a certain control margin with respect to the smallest permissible control angle which is required for maintaining reliable operation.

Usually, the control equipment for a rectifier and an inverter is designed in similar manner, whereby in the rectifier a current controller is activated and in the inverter control equipment for a control with the aim of maintaining the extinction angle at, but not lower than, a preselected lowest value is activated. This is achieved by applying to the current controllers of both the rectifier and the inverter current reference values formed in dependence on the current order for the rectifier and to the current controller of the inverter, in addition, a current margin with a value different from zero and with such a sign that the current controller strives to reduce the direct current controlled by the rectifier. The current margin of the rectifier is given a value equal to zero. The current orders and the current margins for the rectifier and the inverter are coordinated via a telecommunication link. Voltage reductions in the alternating-voltage network of the rectifier may lead to the rectifier not being able to maintain the ordered current. When the current has dropped by an amount corresponding to the current margin of the inverter, the inverter takes over the current control and controls the current on a value equal to the current order reduced by the current margin. The transferred active power in the dc connection thus drops in relation to the amounts of the voltage reduction and of the current margin. The transition process is usually also associated with a transient reduction of the current by a value greater than the current margin.

For a general description of the technique for transmission of high-voltage direct current, reference is made to Erich Uhlmann: Power Transmission by Direct Current, Springer Verlag, Berlin Heidelberg New York 1975, in particular pages 125–140.

To counteract the reduction of transferred power under the above-mentioned circumstances, it has been proposed to use a controller which, when it has been determined that the inverter has taken over the current control, via a feedback control circuit increases the current reference value of the inverter by a value corresponding to the current margin. However, this entails a complication of the control equipment and an often difficult tuning of the dynamic behaviour of the controller.

Thus, it is a desire to reduce the current margin in order to reduce transients and loss of transferred power. The current margin has usually been given values of typically 0.1 per unit, among other things due to the need of coordination of the current order between the rectifier and the inverter, which has often been performed through ordinary telephone communication. With faster and automatically operating telecommunication links, the current margin may be reduced to typically the order of magnitude of 0.02 per unit. This means that unavoidable transitions Of the current control to the inverter are performed with a smaller reduction of the current and with less transients during the transition process.

In series-compensated converter stations, by which are meant converter stations the converter bridges of which are connected to the respective alternating-voltage network via series capacitors, possibly via an intermediate transformer, the risk of the current control being transferred to the inverter increases. The reason for this is that the rectifier in series-compensated converter stations can normally operate with nominal control angles, related to the phase position for the voltages of the alternating-voltage network, which are smaller than those of the non-series-compensated ones, typically with control angles of about 5° instead of about 15°. When the voltage of the rectifier as a function of the control angle $\alpha$ is substantially proportional to cos$\alpha$, the direct voltage at nominal control angle for a series-compensated converter station will have a flatter dependence on the control angle, which entails a reduced control margin.

In case of large voltage reductions in the alternating-voltage network of the rectifier, typically greater than 0.1 per unit, for example caused by errors in the alternating-voltage network or, if this is weak, when connecting a large load, certain problems may arise in the coordination of the current reference values of the rectifier and the inverter. The control equipment of the converter normally comprises a limitation of the current order in dependence on the direct voltage at the respective converter, designed such that the current order with decreasing direct voltage is limited to a value decreasing with the voltage and is limited, at a lower voltage level, to a constant value. Current controllers in the control equipment of the converters are supplied with the current order, thus limited, as current reference values. However, it is the current order prior to this limitation that is coordinated, via the telecommunication link, between the rectifier and the inverter. It is probable that, in connection with the above-mentioned large voltage reductions, the voltage-dependent limitations of the current order become effective. Since, however, the direct voltage of the rectifier, particularly in case of errors, may significantly deviate from the direct voltage of the inverter, the limitations of the current order in the rectifier and the inverter, respectively, may cause the current controller of the inverter to be supplied with a current reference value which is greater than that which is supplied to the current controller of the rectifier. If the difference between the current reference values exceeds the current margin, the current controller of the inverter then tends to increase the current, which can only take place by a further reduction of the direct voltage of the inverter. Thus, in such cases, the control equipment of the inverter strives, with respect to the direct voltage of the inverter, in a direction opposite to the direction aimed at with its control, and it is clear that the risk of this situation arising increases with decreasing current margin.

The phenomena which, as described above, have been able to occur in connection with voltage reductions in the alternating-voltage network of the rectifier may analogously occur in connection with voltage increases in the alternating-voltage network of the inverter. Voltage increases in the alternating-voltage network of the inverter may, especially if the network is weak, still arise in situations in which, because of a fault in the dc transmission, the transferred active power is reduced.

SUMMARY OF THE INVENTION

The object of the invention is to provide a method of the kind described in the introduction, which permits a low current margin in connection with voltage variations occurring during normal operation and which, in case of large voltage reductions, makes it possible to ensure that the control equipment of the inverter continues to operate in the desired manner, that is, to strive to increase the voltage to a suitable maximum voltage for the operating conditions of the installation.

What characterizes a method and a device according to the invention will become clear from the appended claims.

Advantageous improvements of the invention will become clear from the following description and claims

BRIEF DESCRIPTION OF THE DRAWINGS

The invention will be explained in greater detail by description of embodiments with reference to the accompanying drawings, wherein FIG. 1 schematically shows an installation for transmission of high-voltage direct current with series-compensated converter stations.

DESCRIPTION OF THE PREFERRED EMBODIMENTS

The following description relates both to the method and to the device, and the figures can thus be regarded both as signal flow diagrams and block diagrams of devices.

Figure 1:
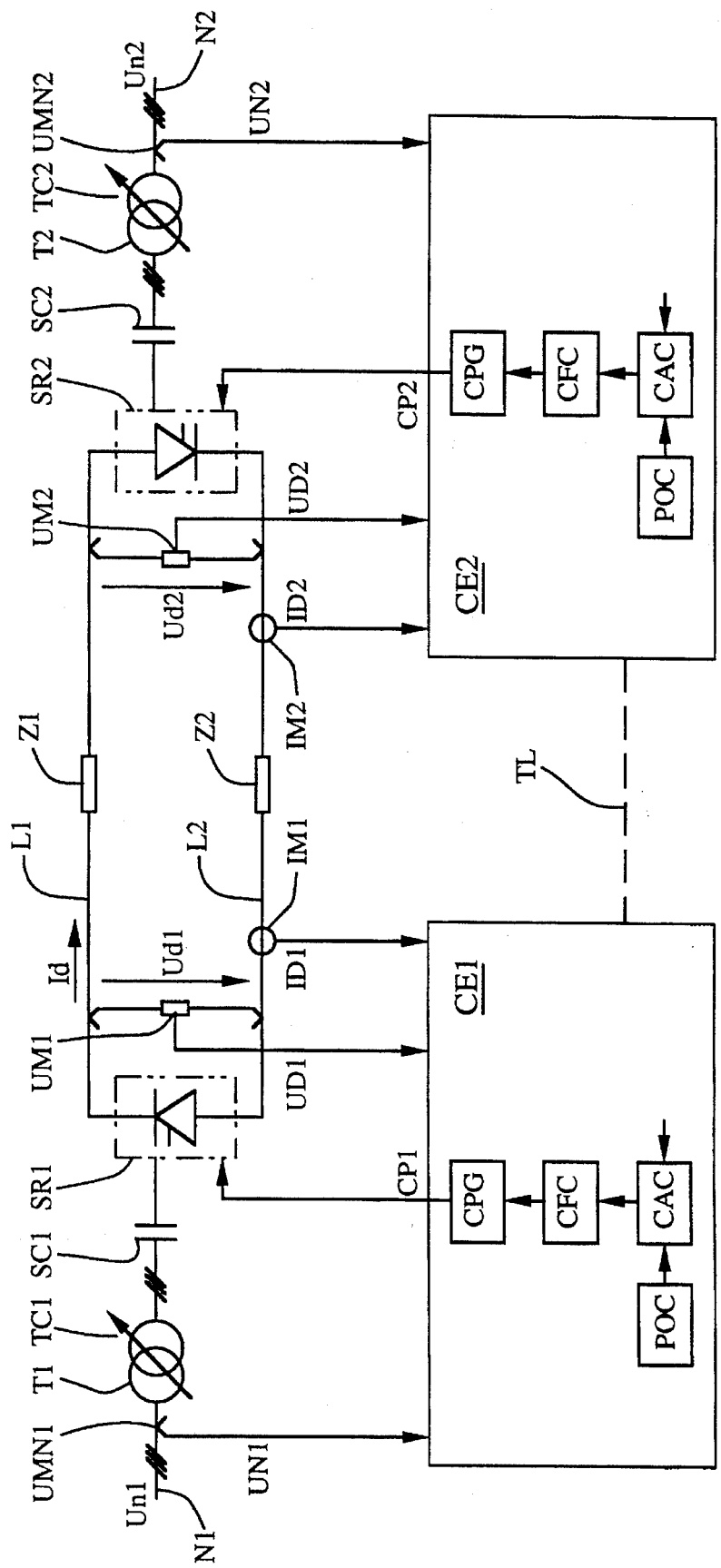

FIG. 1 shows an installation for transmission of high-voltage direct current between two three-phase alternating-voltage network N1 and N2, only roughly indicated.

A first converter SR1 is connected with its alternating-voltage terminals to the network N1 via series capacitors SC1 and a transformer T1 and a second converter SR2 is connected with its alternating-voltage terminals to the network N2 via series capacitors SC2 and a transformer T2. Each one of the transformers is equipped with a tap-changer TC1, TC2, respectively, marked with an arrow in the figure. A dc connection L1, L2 connects the direct-voltage terminals of the converter SR1 to the corresponding direct-voltage terminals on the converter SR2. The impedances of the dc connection are designated Z1, Z2, respectively. Further, shunt filters (not shown in the figure) for generation of reactive power and filtering of harmonics are connected to the respective alternating-voltage network.

For the description of the embodiment it is assumed that during normal operation active power is transferred in a direction from the converter SR1 to the converter SR2, that is, that the converter SR1 operates as a rectifier and the converter SR2 operates as an inverter. However, both converters are adapted to be able to operate in a known manner both as rectifiers and inverters.

The direct voltage UD1 of the rectifier and the direct voltage Ud2 of the inverter are measured by means of voltage-measuring devices UM1, UM2, respectively, which deliver the measured values UD1 and UD2, respectively. The current Id through the dc connection is measured by means of current measuring devices IM1, IM2, respectively, which deliver the measured values ID1 and ID2, respectively. The voltages Un1 and Un2, respectively, of the alternating-voltage network are measured by means of voltage-measuring devices UMN1 and UMN2, respectively, which deliver the measured values UN1 and UN2, respectively.

Each converter is equipped with a piece of control equipment CE1, CE2, respectively, to which the above-mentioned measured values of the operating parameters of the installation are supplied, that is, the control equipment of the rectifier is supplied with measured values for the voltage of the alternating-voltage network, for the direct voltage of the rectifier, and the direct current in the dc connection, and the control equipment of the inverter is supplied with corresponding measured values relating to the inverter. In addition, the pieces of control equipment are supplied (in a manner not shown in the drawings but known per se) with input signals with information about the position of the tap changers and a power-direction signal RECT/INV, the latter signal indicating rectifier operation and inverter operation, respectively, and being determined in dependence on the power direction requested by the operator of the installation.

In dependence on measured values and input signals supplied to the pieces of control equipment, the pieces of control equipment of the rectifier and the inverter generate control pulses CP1 and CP2, respectively, for valves arranged in a known manner in the converters and supply these to the respective valve.

Each one of the pieces of control equipment comprises a control angle unit CAC for forming an ordered value of a control angle $\alpha$ for the valves of the respective converter, which control angle unit will be described in greater detail below, and units CFC, designed in a known manner, for determining the firing moment of the respective valve in dependence on the ordered value of the control angle $\alpha$, and CPG for generating control pulses CP1 and CP2, respectively. A reference value, formed in a manner known per se, for the direct current in the dc connection is supplied to the control angle unit CAC from a power control unit POC. The control angle unit may also be supplied with other reference values from superordinate control systems, not shown in the figure, for example for control of reactive power exchange with the alternating-voltage networks.

The two pieces of control equipment communicate with each other, in a manner known per se, via a telecommunication link TL for two-way transmission of information about the operating parameters of the converters.

Figure 2:
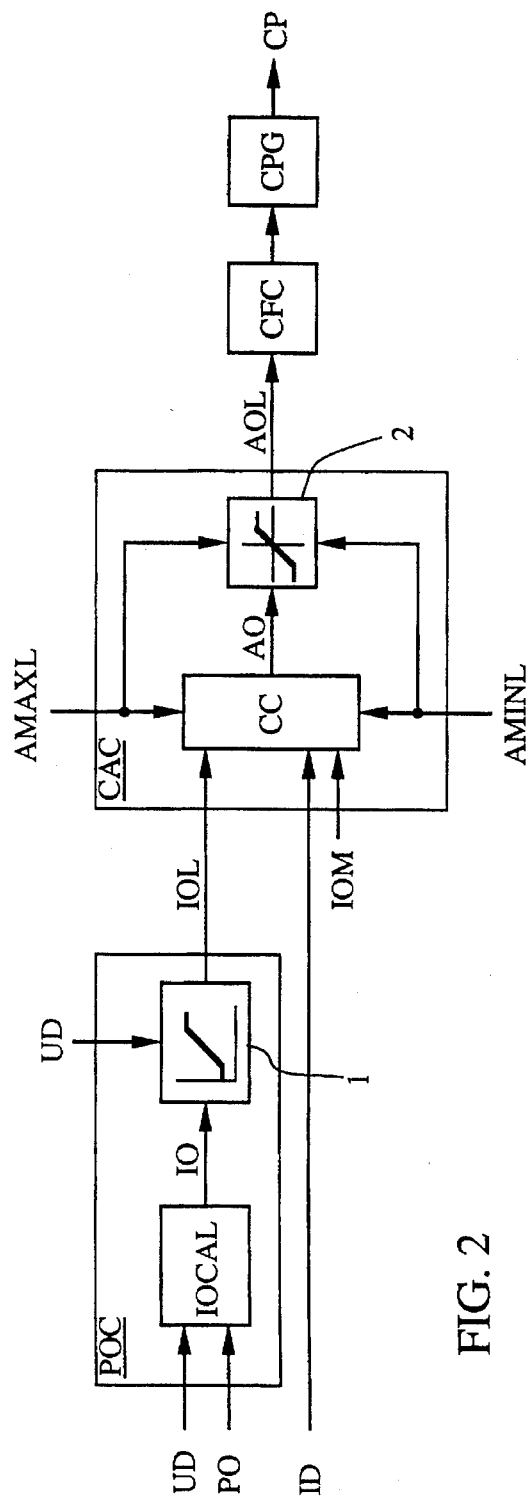
FIG. 2 shows in the form of a block diagram parts of control equipment for the converter stations according to FIG. 1.

FIG. 2 shows parts of a piece of control equipment for the converter stations according to FIG. 1, in one embodiment of the invention. The pieces of control equipment are usually designed identically for both rectifiers and inverters, and therefore in the following FIG. 2 and the subsequent FIG. 3, indices 1 and 2, respectively, for indicating quantities relating to a rectifier and an inverter are not indicated.

The power control unit POC comprises a calculating member IOCAL for calculating a current order IO as the quotient between a power order PO for transferred active power in the dc connection and a measured value UD of the direct voltage Ud in the rectifier. The current order is supplied to a limiting member 1 for limiting the current order in dependence on the measured value UD of the direct voltage Ud, supplied to the above-mentioned limiting member, according to a preselected relationship for the installation. The output signal IOL from the limiting member 1 is thereafter supplied to a current controller CC comprised in the control angle unit CAC as current reference value for this controller, whereby the current controller of the rectifier is supplied with a first current reference value IOL1 and the current controller of the inverter is supplied with a second current reference value IOL2.

The output signal AO of the current controller is limited to its maximum and its minimum value in a limiting member 2 by means of limiting signals AMAXL and AMINL, respectively, which are formed in some manner known per se and are capable of being influenced. The output signal AOL from the limiting member 2 forms an ordered value of the control angle $\alpha$ and is supplied to the unit CFC for determining the firing moment of the respective valve.

Figure 3:
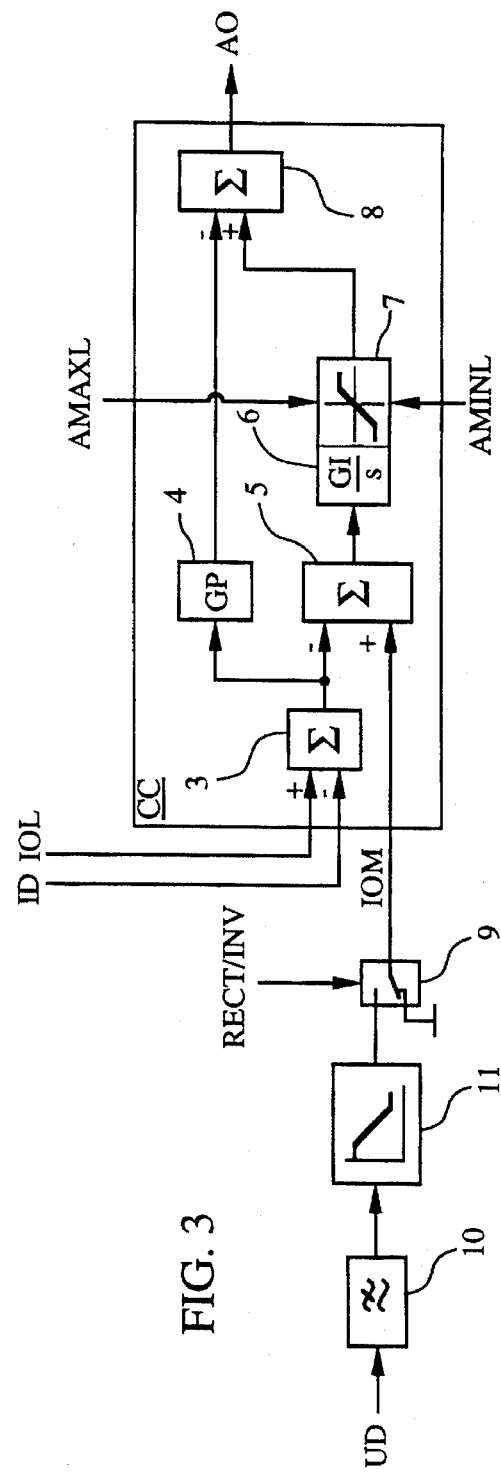
FIG. 3 shows in the form of a block diagram one embodiment of a current controller for control equipment according to FIG. 2, in an embodiment according to the invention

FIG. 3 shows an embodiment of the current controller CC. A summator 3 forms as output signal the difference between the current reference value IOL for the direct current Id and the measured value ID of this current. The difference is supplied to a proportional-amplifying member 4 with a gain FP and to a summator 5. The summator 5 is also supplied with a preselected current margin IOM between the rectifier and the inverter, and thus forms as output signal the difference between the current margin and the output signal from the summator 3. The output signal from the summator 5 is supplied to an integrating member 6 with the integration time constant 1/GI. The integrating member comprises a limiting member 7 which limits the output signal from the integrating member to its maximum and to its minimum value in dependence on the limiting signals AMAXL and AMINL, respectively. The output signals from the proportional-amplifying member 4 and the integrating member, limited by the limiting member 7, are supplied to a summator 8, which as output signal forms the output signal AO of the current controller as the difference between the output signal from the integrating member and the output signal from the proportional-amplifying member.

The current orders IO for the rectifier and the inverter are coordinated via the telecommunication link TL.

By means of a selector 9, controlled by the power-direction signal RECT/INV, the current margin IOM is set equal to zero for the rectifier, and for the inverter at a value different from zero and with such a sign that the control equipment of the inverter strives to reduce the direct current controlled by the rectifier.

Thus, as far as the inverter is concerned, during stationary operation, when the measured value ID2 of the direct current is at least almost equal to the current reference value IOL2, the input signal to the integrating member 6 consists of the current margin, which means that its output signal will assume its maximum value limited by the limiting signal AMAXL. The output signal from the proportional-amplifying member 4 is, under the above-mentioned conditions, equal to zero or near zero, so the value of the control angle $\alpha$ ordered by the inverter is determined by the above-mentioned limiting signal.

Figure 4:
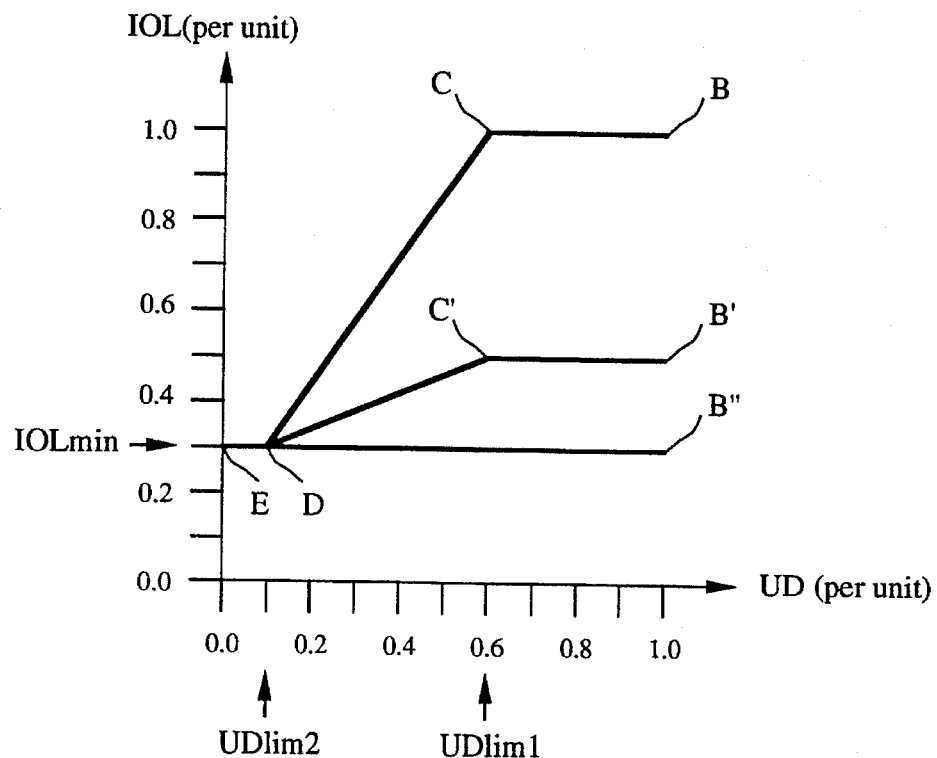
FIG. 4 shows a relationship between voltage and current reference value of a known kind for a limiting member for limiting a current order for control equipment according to FIG. 2.

FIG. 4 shows a relationship of a known kind between the measured value UD of the direct voltage Ud at the respective converter and the output signal IOL from the limiting member 1, that is, the current reference value for the current controller of the converter. On the vertical axis the output signal IOL, expressed in per unit, is shown, and on the horizontal axis the measured value UD of the direct voltage, also expressed in per unit, is shown. The points C and C' correspond to a first limiting voltage Udlim1, corresponding to the measured value UDlim1 and the point D corresponds to a second limiting voltage Udlim2, lower than the first and corresponding to the measured value UDlim2. For voltages lower than Udlim2, the maximum output signal IOL is equal to a lowest value IOLmin to which the current order is limited. The point E corresponds to the voltage zero. For voltages exceeding the first limiting voltage Udlim1, the output signal IOL of the limiting device corresponds to the current order IO supplied to the limiting member. When the voltage decreases from the first limiting voltage to the second, the limitation enters into operation and the maximum output signal of the limiting member decreases linearly with the voltage, as illustrated by the curve parts C-D and C'-D, respectively. The curve B-C-D-E corresponds to a current order equal to 1.0 per unit, the curve B'-C'-D-E corresponds a current order equal to 0.5 per unit, and the curve B"-D-E corresponds to a current order equal to 0.3 per unit. In this embodiment, the first limiting voltage is equal to 0.6 per unit and the second equal to 0.1 per unit and the lowest value IOLmin to which the current order is limited is equal to 0.3 per unit.

Figure 5:
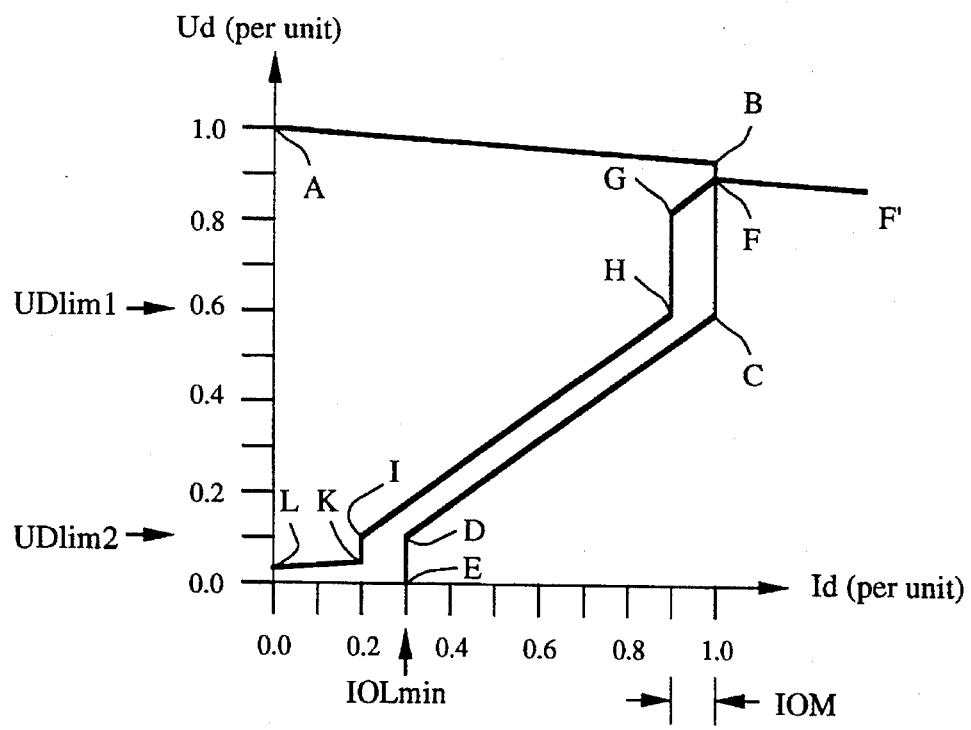
FIG. 5 shows a current/voltage characteristic of a known kind for a rectifier and an inverter connected to a common dc connection.

FIG. 5 shows a static current/voltage characteristic of a known kind for the installation described with reference to FIG. 1. On the vertical axis the direct voltage for the respective converter, expressed in per unit, is shown, and on the horizontal axis the direct current Id in the dc connection, also expressed in per unit, is shown. The curve A-B-C-D-E relates to the rectifier, that is, the first converter SR1 and the curve F'-F-G-H-I-K-L relates to the inverter, that is, the second converter SR2. With the current order equal to 1.0 per unit, F becomes the operating point of the installation. The current margin IOM for the inverter has the value 0.1 and constitutes in FIG. 5 the horizontal distance between the vertical curve parts B-C-D-E and G-H-I-K. The curve part F-G for the inverter is given a positive inclination to achieve damping of oscillations around the working point F. The curve part B-C-D-E reflects the relationship described above between the direct voltage Ud at the respective converter and the output signal IOL from the limiting member 1.

According to the invention, the current margin is now formed in dependence on the direct voltage Ud at the respective converter. The measured value UD of the direct voltage is supplied to a filter 10 with low-pass characteristic (FIG. 3), the output signal of which is supplied to a function-forming member 11. The output signal from the function-forming member 11 is supplied to the selector 9 and forms the current margin IOM when the selector, controlled by the power-direction signal RECT/INV, connects the above-mentioned output signal to the summator 5 in the current controller of the inverter.

Figure 6:
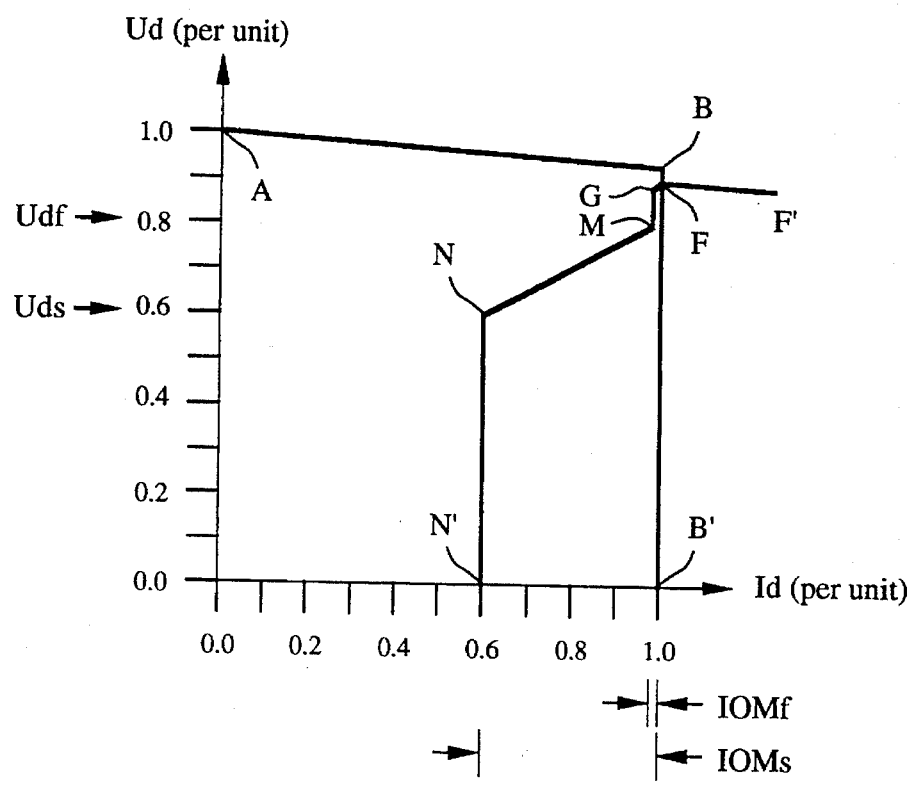
FIG. 6 shows a relationship between voltage and current margin in one embodiment of the invention.

The output signal from the function-forming member 11 is formed in dependence on the measured value UD according to preselected relationship for the installation, as illustrated in FIG. 6.

FIG. 6 shows a static current/voltage characteristic of the same kind as that shown in FIG. 5, but to clarify the invention FIG. 6 does not show the intervention from the limiting member 1. For voltages exceeding a first voltage level Udf, corresponding to a point M on the characteristic of the inverter, and up to the voltage level corresponding to the point G, the current margin assumes a first value IOMf, corresponding to the horizontal distance between the curve parts B-B' and G-M. For voltages lower than the first voltage level Udf but exceeding a second voltage level Uds, corresponding to a point N on the characteristic of the inverter, the current margin increases monotonously, in this embodiment linearly, with decreasing voltage to a second value IOMs, corresponding to the horizontal distance between the curve parts B-B' and N-N', and the magnitude of which is larger than the magnitude of the first value. For voltages lower than the second voltage level, the current margin remains constant and equal to the second value IOMs. In this embodiment the first voltage level Udf is equal to 0.8 per unit and the second voltage level Uds equal to 0.6 per unit. The first value IOMf of the current margin is equal to 0.02 per unit and its second IMOs equal to 0.4 per unit.

Figure 7:
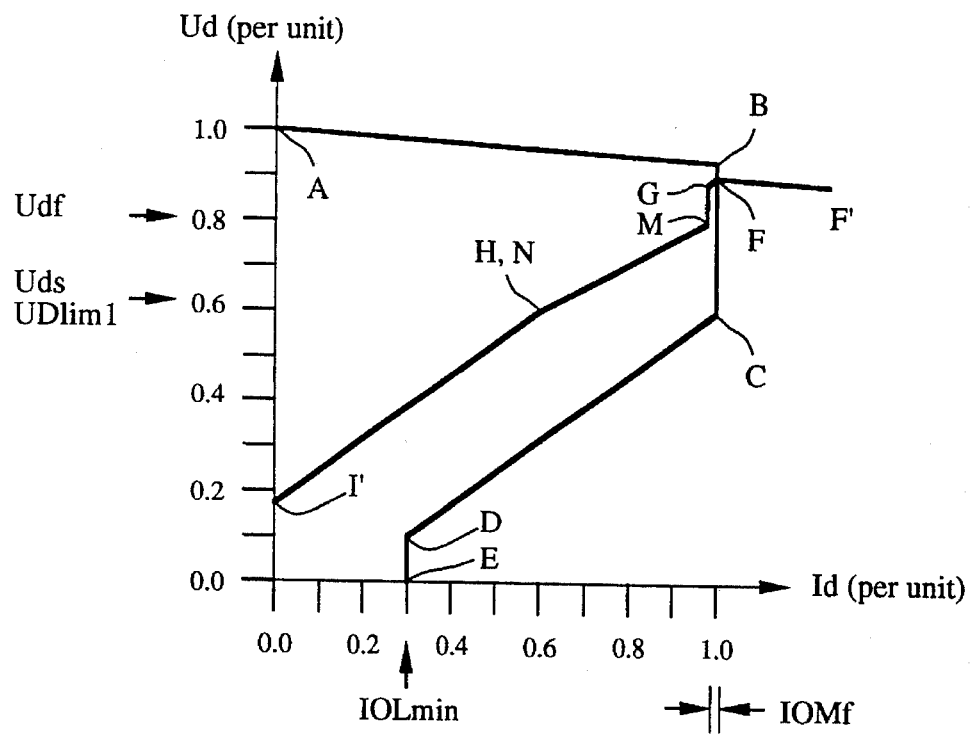
FIG. 7 shows a current/voltage characteristic modified according to one embodiment of the invention for a rectifier and an inverter connected to a common dc connection.

FIG. 7 shows a static current/voltage characteristic of the same kind as that shown in FIG. 5, with interventions from the limiting member 1 and with a voltage-depending current margin as described with reference to FIG. 6. The point H according to FIG. 5, which lies at the same voltage level as the point C in FIG. 4, and the point N according to FIG. 6, lie in this embodiment at the same voltage. The current margin corresponds to the horizontal distance between the curve parts B-C-D-E and F-G-M-H, N-I'.

It is advantageous to choose the current margin such that its second value is larger in magnitude than the lowest current reference value IOLmin to which the current order IO is limited by the first limiting member 1. Especially when resuming power after a fault in the dc transmission, this ensures that the control equipment of the inverter will strive towards the highest possible direct voltage while the rectifier is building up the direct current, which means that ordered active power is rapidly attained. In the embodiments shown above, for voltages Ud<0.6 per unit the current margin has been chosen to be a value 0.4 per unit, which is greater in magnitude than the lowest limiting value, equal to 0.3 per unit, to which the limiting member 1 limits the current reference value IOL for the current controller.

Further, it is advantageous to choose the first voltage level Udf of the function-forming member 11 to be higher than the first limiting voltage Udlim1 of the limiting member 1.

In FIG. 6 the current margin is shown with a positive inclination along the curve part M-N. This is an advantageous embodiment of the invention which brings about smoother unavoidable transitions of the current control from the rectifier to the inverter when the voltage lies in the region between the first and second voltage levels, that is, when Udf>Ud>Uds. To attain the primary object of the invention, however, it is sufficient to increase the current margin when the voltage is lower than a preselected value, for example such that the function-forming member 11 forms a value of the current margin equal to 0.4 per unit when the voltage is lower than the first voltage level. This would in FIG. 6 correspond to a situation where the curve part M-N runs in parallel with the horizontal axis at the voltage level 0.8 per unit.

Thus, by means of the invention the advantage is achieved that, in case of voltage variations occurring during normal operation, the installation is able to operate with a low current margin, which during unavoidable transitions of the current control to the inverter means that these take place with small disturbances in the operation and low reductions of transferred power, while at the same time, in case of large voltage reductions, typically larger than 0.1 per unit, the control equipment of the inverter continues to operate in the desired way, that is, to strive to increase the voltage to a suitable maximum voltage for the operating conditions of the installation.

The installation shown in FIG. 1 comprises series-compensated converter stations. However, the problem solved by the invention also arises in non-series-compensated converter stations and, consequently, it is applicable to such installations as well. However, the invention is especially important in series-compensated converter stations in which the rectifier operates at low nominal control angles and in which the risk of transition of the current control to the inverter is greater than for non-compensated converter stations.

The limiting members and function-forming members shown in block diagrams may, in applicable parts, be designed as a model comprising analog and/or digital means for the modelling, or be completely or partially designed as calculations by means of analog and/or digital technique in hard-wired circuits, or be implemented as programs in a microprocessor.

We claim:

1. A method for control of an installation for transmission of high-voltage direct current, comprising a first and a second series-compensated converter (SR1, SR2, respectively) which are mutually connected via a common dc connection (L1, L2), each one controlled by a separate piece of control equipment (CE1, CE2, respectively) and each one connected to a separate alternating-voltage network (N1, N2, respectively), each one of the pieces of control equipment comprising a current controller (CC), which is supplied with a current reference value (IOL1, IOL2, respectively) for the current (Id) in the dc connection, the current controller of the first converter being supplied with a first current reference value (IOL1) and the current controller of the second converter being supplied with a second current reference value (IOL2) and, in addition, with a current margin (IOM), a first value (IOMf) is assigned to the current margin when the direct voltage at the second converter exceeds a first preselected voltage level (Udf) and a second value (IOMs) is assigned to the current margin, the magnitude of said second value being greater than the magnitude of the first value, when said direct voltage is lower than the first voltage level.

2. A method according to claim 1, wherein when the direct voltage of the second converter is lower than the first voltage level but exceeds a second preselected voltage level (Uds), the current margin is monotonously changed from said first value to said second value when said direct voltage is changed from the first voltage level to the second voltage level.

3. A method according to claim 1, wherein each one of the pieces of control equipment further comprises a limiting member (1), which is supplied with a current order (IO) common to the converters and forms the first and second current reference values, respectively, by limitation of the current order in dependence on a applied measured value (UD) of the direct voltage (Ud1, Ud2, respectively) at the respective converter, said limitation entering into operation when said direct voltage is lower than a first limiting voltage (Udlim1), the first voltage level is chosen higher than the first limiting voltage of the limiting member.

4. A method according to claim 1, wherein the second value of the current margin is greater in magnitude than the lowest value (IOLmin) to which the current order is limited.

5. A device for control of an installation for transmission of high-voltage direct current, comprising a first and a second series-compensated converter (SR1, SR2, respectively) which are mutually connected via a common dc connection (L1, L2), each one controlled by a separate piece of control equipment (CE1, CE2, respectively) and each one connected to a separate alternating-voltage network (N1, N2, respectively), each one of the pieces of control equipment comprising a current controller (CC), which is supplied with a current reference value (IOL1, IOL2, respectively) for the current (Id) in the dc connection, the current controller of the first converter being supplied with a first current reference value (IOL1) and the current controller of the second converter being supplied with a second current reference value (IOL2) and, in addition, with a current margin (IOM), the control equipment of at least the second converter further comprises a function-forming member (11) which in dependence on an applied measured value (UD) of the direct voltage at the second converter forms the current margin such that, when said direct voltage exceeds a first preselected voltage level (Udf), the current margin assumes a first value (IOMs) and, when said direct voltage is lower than the first voltage level, the current margin assumes a second value (IOMs), the magnitude of the second value being greater than the magnitude of the first value.

6. A device according to claim 5, wherein the function-forming member, when the direct voltage at the second converter is lower than the first voltage level but exceeds a second preselected voltage level (Uds), forms the current margin such that the current margin is monotonously changed from said first value to said second value when said direct voltage is changed from the first voltage level to the second voltage level.

7. A device according to claim 5, wherein each one of the pieces of control equipment further comprises a limiting member (1), which is supplied with a current order (IO) common to the converters and forms the first and second current reference values, respectively, by limitation of the current order in dependence on an applied measured value (UD) of the direct voltage (Ud1, Ud2, respectively) at the respective converter, said limitation entering into operation when said direct voltage is lower than a first limiting voltage (Udlim1), the first voltage level exceeds the first limiting voltage of the limiting member.

8. A device according to claim 5, wherein the function-forming member forms the second value of the current margin such that this is greater in magnitude than the lowest value (IOLmin) to which the limiting member limits the current order.

9. A method for control of an installation for transmission of high-voltage direct current, comprising a first and a second series-compensated converter (SR1, SR2, respectively) which are mutually connected via a common dc connection (L1, L2), each one controlled by a separate piece of control equipment (CE1, CE2, respectively) and each one connected to a separate alternating-voltage network (N1, N2, respectively), each one of the pieces of control equipment comprising a current controller (CC), which is supplied with a current reference value (IOL1, IOL2, respectively) for the current (Id) in the dc connection, the current controller of the first converter being supplied with a first current reference value (IOL1) and the current controller of the second converter being supplied with a second current reference value (IOL2) and, in addition, with a current margin (IOM), each one of the pieces of control equipment further comprising a limiting member (1), which is supplied with a current order (IO) common to the converters and forms the first and second current reference values, respectively, by limitation of the current order in dependence on an applied measured value (UD) of the direct voltage (Ud1, Ud2, respectively) at the respective converter, said limitation entering into operation when said direct voltage is lower than a first limiting voltage (Udlim1), a first value (IOMf) is assigned to the current margin when the direct voltage at the second converter exceeds a first preselected voltage level (Udf) and a second value (IOMs) is assigned to the current margin, the magnitude of said second value being greater than the magnitude of the first value, when said direct voltage is lower than the first voltage level, and that the first voltage level is chosen to be higher than the first limiting voltage of the limiting member.

10. A device for control of an installation for transmission of high-voltage direct current, comprising a first and a second series-compensated converter (SR1, SR2, respectively) which are mutually connected via a common dc connection (L1, L2), each one controlled by a separate piece of control equipment (CE1, CE2, respectively) and each one connected to a separate alternating-voltage network (N1, N2, respectively), each one of the pieces of control equipment comprising a current controller (CC), which is supplied with a current reference value (IOL1, IOL2, respectively) for the current (Id) in the dc connection, the current controller of the first converter being supplied with a first current reference value (IOL1) and the current controller of the second converter being supplied with a second current reference value (IOL2) and, in addition, with a current margin (IOM), each one of the pieces of control equipment further comprising a limiting member (1), which is supplied with a current order (IO) common to the converters and forms the first and second current reference values, respectively, by limitation of the current order in dependence on an applied measured value (UD) of the direct voltage (Ud1, Ud2, respectively) at the respective converter, said limitation entering into operation when said direct voltage is lower than a first limiting voltage (Udlim1), the control equipment of at least the second converter further comprises a function-forming member (11), which in dependence on an applied measured value (UD) of the direct voltage at the second converter forms the current margin such that, when said direct voltage exceeds a first preselected voltage level (Udf), the current margin assumes a first value (IOMf) and, when said direct voltage is lower than the first voltage level, the current margin assumes a second value (IOMs), the magnitude of said second value being greater than the magnitude of the first value, and that the first voltage level exceeds the first limiting voltage of the limiting member.

* * * * *